United States Patent [19]

Langen et al.

[11] 4,368,080
[45] Jan. 11, 1983

[54] METHOD OF REMOVING RUST FROM METALLIC OBJECTS

[76] Inventors: Robert Langen, Quienstrasse 29, D-6600 Saarbrücken; Rasmus Beck, Nachtigallenstrasse 62, D-6978 Neu Isenburg, both of Fed. Rep. of Germany

[21] Appl. No.: 201,268

[22] Filed: Oct. 27, 1980

[30] Foreign Application Priority Data

Oct. 25, 1979 [DE] Fed. Rep. of Germany ....... 2943107

[51] Int. Cl.³ .............................................. B08B 7/00
[52] U.S. Cl. ........................................ 134/1; 134/21; 219/121 LM
[58] Field of Search ................ 134/1, 21; 219/121 L, 219/121 LH, 121 LJ, 121 LM; 331/DIG. 1

[56] References Cited

U.S. PATENT DOCUMENTS 3,154,890 11/1964 Lemelson ........................ 134/1 X
3,373,752 3/1968 Inove ................................ 134/1
3,503,804 3/1970 Schneider ........................ 134/1

OTHER PUBLICATIONS

Electronics, "Lasers Strip Wire Insulation", vol. 49, No. 19, pp. 50,52.

Primary Examiner—Marc L. Caroff
Attorney, Agent, or Firm—Kontler, Grimes & Battersby

[57] ABSTRACT

Rust is removed from the surfaces of metallic objects by focusing a laser beam on successive increments of the surface so that the beam causes evaporation of rust. The laser is a gas laser and is designed to effect pulsed emission of coherent radiation. The output power of the laser is selected in such a way that the beam cannot melt or evaporate the parent metal.

10 Claims, 2 Drawing Figures

METHOD OF REMOVING RUST FROM METALLIC OBJECTS

BACKGROUND OF THE INVENTION

The present invention relates to removal of scale or rust (hereinafter called rust) from the surfaces of metallic objects, and more particularly to improvements in a method of removing undesirable products of oxidation from surfaces of metallic objects, such as ducts, pipes or sheets made of steel or other oxidizable material.

Proper cleaning of metallic surfaces is an indispensable prerequisite for the establishment of a lasting protection against further corrosion. If a protective layer (e.g., paint) is applied to a metallic surface which is coated with rust, the loose texture of rust invariably or almost invariably allows for entrapment of some oxygen below the protective layer. The thus entrapped oxygen entails further corrosion of parent metal even though such corrosion is limited due to the fact that the entrapped oxygen is sealed from the surrounding atmosphere. Since the volume of the oxidized layer on a metallic surface exceeds the volume of the corresponding portion of parent metal prior to corrosion, oxidation which takes place below a protective layer of paint or the like tends to cause blistering of, and the development of cracks in, the protective layer. The result is that additional oxygen can penetrate below the damaged layer with attendant progression of corrosion in the parent metal. Therefore, and as stated above, any effective prevention of further corrosion must be preceded by thorough and complete removal of rust. Attempts to convert rust have met with limited success. Such technique is not sufficiently reliable to warrant resort thereto under any but certain specific circumstances.

Presently known procedures for removal of rust include sand blasting and analogous techniques (according to which one or more jets of sharp sand or steel shot are directed against the affected metallic surfaces to mechanically remove the rust), treatment by flames to cause peeling of fragments of corroded material off the surface of parent metal, mechanical treatment by resort to brushes or the like, and pickling with acids. All of these prior procedures exhibit certain drawbacks, for example, excessive development of dust, vapors, waste liquors or the like, i.e., such techniques are likely to find disfavor with environmental protection agencies. In addition, each of the above-enumerated conventional techniques exhibits further drawbacks which are characteristic of sand blasting, flame treatment, pickling, etc. For example, sand blasting is likely to affect the appearance and/or texture of the surface of parent metal, and excessive pickling is likely to leave unsightly marks on the surface which is free of rust.

OBJECTS AND SUMMARY OF THE INVENTION

An object of the invention is to provide a novel and improved method of removing rust from metallic surfaces in a time-saving manner.

Another object of the invention is to provide a method which can be resorted to for removal of rust from a wide variety of metallic objects and which can be used to effect complete removal of corroded portions of a metallic body without affecting the parent metal behind the rust.

A further object of the invention is to provide a method of removing rust which does not affect the environment and which is more economical and more reliable than heretofore known methods.

An additional object of the invention is to provide a method of removing rust which does not entail the development of dust and/or waste liquor.

Another object of the invention is to provide a method which can be used for removal of rust from slightly, pronouncedly or highly corroded metallic objects.

A further object of the invention is to provide a method which can be practiced by resorting to relatively simple and compact apparatus.

An additional object of the invention is to provide a method which renders it possible to remove oxidate from a metallic surface with a degree of reliability higher than sand blasting, flame treatment, pickling and/or a combination of such conventional techniques.

One feature of the invention resides in the provision of a method of removing rust from the surface of a body or object consisting of oxidizable material (e.g., from a pipe made of steel or another alloy, from a sheet which is made of steel or the like, or from a duct which has flat metallic walls).

The method comprises the step of focusing a laser beam upon the rust to effect evaporation of rust from the surface of the object. The method preferably further comprises the step of pulsing the laser beam; the duration of each pulse may be between 1 and 100 $\mu$s. The power output of the laser beam may be between 1 and 5 ws per pulse.

The focusing step may include focusing the beam upon a spot with an area of between 0.3 and 2 cm$^2$. The frequency of the pulsed beam may be between 1 and 1000 hertz, preferably between 100 and 500 hertz.

The method preferably further comprises the step of establishing a protective atmosphere in the region of impingement of the laser beam upon the surface of the object. The protective atmosphere is preferably a reducing atmosphere.

Still further, the method may comprise the step of passivating successive deoxidized portions of the surface of the object. Such passivating step may include directing against the locus of impingement of the beam upon the object at least one substance which forms a protective layer on the deoxidized portion of the surface of the object as a result of action of the laser beam upon such substance (i.e., the laser beam establishes the conditions which are needed to enable the admitted substance to form a protective layer on the freshly cleaned portion of the surface). The just mentioned substance is preferably a flowable substance so that it can be admitted by a conduit or the like.

The method also comprises the step of effecting relative movement between the beam and the object so that the beam impinges upon successive portions or spots of the surface which requires a deoxidizing treatment. This can be achieved by moving the beam relative to the object and/or vice versa.

The apparatus for the practice of the just outlined method comprises a laser which emits a beam of coherent radiation, means for focusing the beam upon the surface of the object so as to evaporate the rust which is to be removed from the object, and means for effecting relative movement between the locus where the beam impinges upon the object and the surface of such object. The laser is preferably a gas laser, most preferably an atmospheric-pressure gas laser. Moreover, the laser is preferably of the type wherein oscillation occurs on transverse modes.

The apparatus further comprises (or may comprise) means for guiding the beam from the laser to the surface of the object; such means for guiding can include a mouthpiece having a beam discharging portion and the apparatus then preferably further comprises a hood (e.g., a deformable bellows) which surrounds the beam discharging portion of the mouthpiece.

A source of flowable material may be provided close to or at a location which is remote from the discharging portion of the mouthpiece, and one or more conduits are then used to convey such material from the source into the interior of the hood so as to discharge close to the locus of impingement of the beam upon the surface of the object. The source may contain a protective gas or a substance which, when subjected to the action of the laser beam, forms a protective layer on successively cleaned portions of the object. Still further, the apparatus may comprise a suction pipe or other suitable means for evacuating evaporated rust from the interior of the hood, and means for adjusting the position of the focusing means.

The apparatus may comprise one or more lasers or a laser with beam splitting means.

The beam or beams issuing from the laser or lasers cause evaporation of rust. This does not affect the health and/or comfort of the attendants and does not contribute to pollution of the surrounding atmosphere. The generation of dust or dirt is negligible or non-existent and the evaporation products are harmless. Moreover, and as stated hereinabove, the evaporation products can be evacuated from the locus of application of one or more laser beams to a metallic surface so that the surrounding atmosphere is completely or nearly completely devoid of evaporation products. The cost of equipment for gathering and evacuation of evaporation products is minimal or very reasonable. The laser beam or beams can be focused on selected portions of a metallic surface with a high degree of accuracy to ensure that the beams do not affect the appearance and/or other characteristics of neighboring areas, namely, of areas which do not require any deoxidizing treatment or whose derustification treatment is already completed. The result is that the quality of a cleaned metallic surface is surprisingly high, that the losses in metal are negligible or non-existent, and that the texture of parent metal is not affected at all.

The fact that losses in parent metal are negligible or non-existent is a very important and highly desirable feature of the improved method. In experimenting with laser beams, it was necessary to overcome numerous prejudices and reservations of experts in this field, especially the popular belief that heating to a temperature which will cause evaporation of rust will also result in excessive heating of parent metal, i.e., the temperature which causes the evaporation of rust will suffice to cause melting and/or evaporation of the main portion of a metallic object adjacent to the corroded area. It has been found that such fears are unfounded primarily due to pronounced differences between the thermal conductivity of rust and the thermal conductivity of parent metal. Thus, all that is necessary is to properly meter the admitted energy so that such energy suffices for evaporation of rust but is not likely to melt or is incapable of causing any melting and/or evaporation of parent metal. As a rule, the minimum heating action which is needed to evaporate rust is not sufficient to raise the temperature of parent metal to a level at which such metal would begin to melt and/or evaporate, especially if the application of heat by one or more laser beams is of short or very short duration, i.e., barely sufficient to effect appropriate heating and evaporation of the corroded substance. Such short-lasting application of heat to rust at the exterior of parent metal does not suffice to allow for conduction of requisite quantities of heat energy into the interior of the metallic object which is under treatment. Thus, the heat absorbing capacity of metal is not exhausted at the time when the laser beam or beams complete the evaporation of rust.

Furthermore, and if the thermal conductivity of an oxide layer is very high so that it equals or approximates that of the parent metal, and if the oxide layer adheres to the unaffected surface of the metallic object with a great force so that its heat transfer coefficient in relation to that of the parent metal is very high (i.e., that the oxide layer cannot be readily evaporated due to conduction of heat energy into the interior of parent metal at a rate which is the same as the heat conductivity of the parent metal itself), the porosity of such strongly adhering oxide layer is highly likely to be extremely low so that the layer cannot retain any or cannot retain appreciable quantities of oxygen. Consequently, the failure of one or more laser beams to evaporate such dense oxide layer or layers is not detrimental at all because the oxide layer or layers are devoid of free oxygen which could cause oxidation below a protective layer of paint or the like. In other words, such non-porous oxide layer or layers can be readily coated with a protective film (e.g., paint), either subsequent to application of a priming paint layer or directly onto the non-porous oxide layer or layers. In other words, an additional feature of the invention resides in the recognition that, if the laser beam or beams are incapable of evaporating an oxide layer, such layer need not be removed (e.g., by resorting to other techniques) because it is not likely to constitute a breeding ground for further oxidation subsequent to the application of one or more protective films thereover.

It is presently preferred to employ laser means which can furnish one or more pulsed beams. This contributes to the aforediscussed advantages of the improved method and also to convenience of removal or evacuation of evaporated oxide layer or layers. Moreover, the application of impulses instead of a continuous uninterrupted laser beam allows for more convenient removal of heat (between successive impulses) and contributes to the power output of the laser (as compared with a laser which is designed for continuous emission of coherent radiation). The preferred duration of impulses is between 1 and 100 $\mu$s, and the presently preferred energy emission is between 1 and 5 ws per impulse while the beam is focused upon a spot whose area is between 0.3 and 2 cm$^2$. The impulse frequency may be in the range of between 1 and 1000 hertz, preferably between 100 and 500 hertz.

As stated above, the method can be practiced while the freshly treated surface is protected against corrosion by passivation. Such passivation can be effected by resorting to one or more well known passivating substances or to passivating devices which are particularly effective to protect a metallic surface which is exposed to a laser beam. The composition of the passivating substance or substances may be such that they are capable of reacting with the metal. The thus obtained reaction products then constitute a protective layer for the exposed surface which has been relieved of oxide and is adjacent to the locus or loci of removal of oxide layers. The arrangement may be such that the substance or substances which are used to passivate the freshly cleaned surface or surfaces of parent metal are caused to react with such metal under the circumstances which are established as a result of exposure of metal to a laser beam. In this manner, the relatively high or very high temperatures which develop as a result of exposure of oxide layers to laser beams (as well as certain other circumstances, such as the presence of a plasma atmosphere) can be utilized with advantage, for example, to cause reactions which could not be initiated at all or could not be readily initiated under other circumstances. For example, it is known that one can develop free radicals in a plasma atmosphere and that such free radicals exhibit a very high degree of activity. Nevertheless, the development of plasma should be restricted, if possible, because the absorption of laser beams is quite pronounced if the density of free electrons is high.

It is further desirable to carry out the exposure of oxide layers to laser beams under a protective atmosphere, preferably in the presence of a reducing gas. This not only impedes the progress of oxidation but the protective gas can be used as a vehicle for removal of evaporation products and/or reaction products.

It was further found that, quite surprisingly, the establishment of a protective atmosphere brings about additional beneficial results. Thus, one can obtain, with a relatively low energy input, a metallic surface which is totally free of rust. If the exposure to laser beams takes place in an oxidating atmosphere, a magnetic layer is highly likely to develop on the surface of parent metal. The layer of magnetite adheres to the surface of parent metal with a force which is sufficiently pronounced to prevent its removal at temperatures which are sufficient to cause removal of oxide layers. In other words, the evaporation temperature of magnetite is much higher than that of oxide layers (rust). If the exposure to laser beams takes place in a reducing atmosphere, the magnetite layer does not adhere to the parent metal with a great force so that such layer can be readily removed by a brush or by a similar or analogous mechanical cleaning implement. Furthermore, the porosity of magnetite is relatively low so that it need not always be removed from the parent metal because its capability to confine in its pores a relatively large quantity of oxygen is practically nil. Thus, if a relatively thin magnetite layer adheres to the parent metal with a great force, such magnetite layer can be left untouched and the parent metal can be coated with one or more protective layers or films of paint or the like without risking further oxidation in the region of the concealed magnetite layer. Another possibility of relieving the parent metal of magnetite layers is by resorting to chemical treatment of any conventional nature. This presents no problems because a magnetite layer which strongly adheres to parent metal is very thin or extremely thin.

The laser which is presently preferred for the practice of the invention is an atmospheric-pressure layer wherein the oscillation occurs on transverse modes. Such laser is compact, it can emit short impulses, and its efficiency (in the range of 10 percent) is reasonably good.

The aforediscussed method can be practiced for removal of oxide layers from a wide variety of metallic objects. It has been found that the method can be used with particular advantage as a substitute for presently known sand blasting and analogous techniques. An important advantage of removal of oxide layers by laser beams instead of resorting to sand blasting is that the improved method does not involve the application of undesirable mechanical forces to the surfaces of parent metal.

The novel features which are considered as characteristic of the invention are set forth in particular in the appended claims. The apparatus for the practice of the method, both as to its construction and its mode of operation, together with additional features and advantages of the method, will be best understood upon perusal of the following detailed description of certain specific embodiments with reference to the accompanying drawing.

DESCRIPTION OF THE PREFERRED EMBODIMENTS

Figure 1:
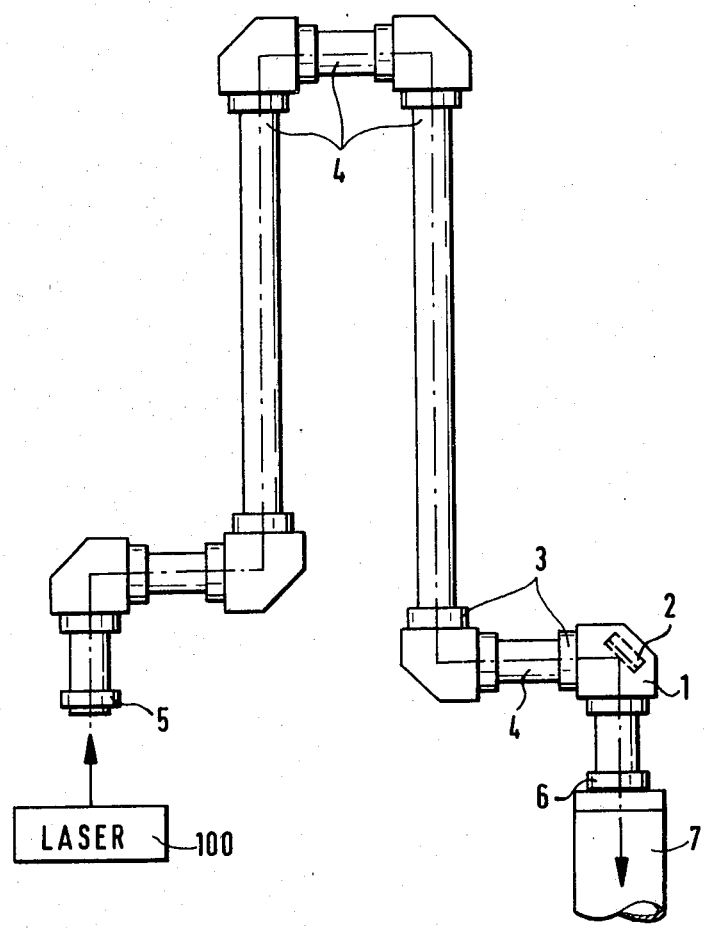
FIG. 1 illustrates one embodiment of the beam guide means which can be used in the apparatus.
Figure 2:
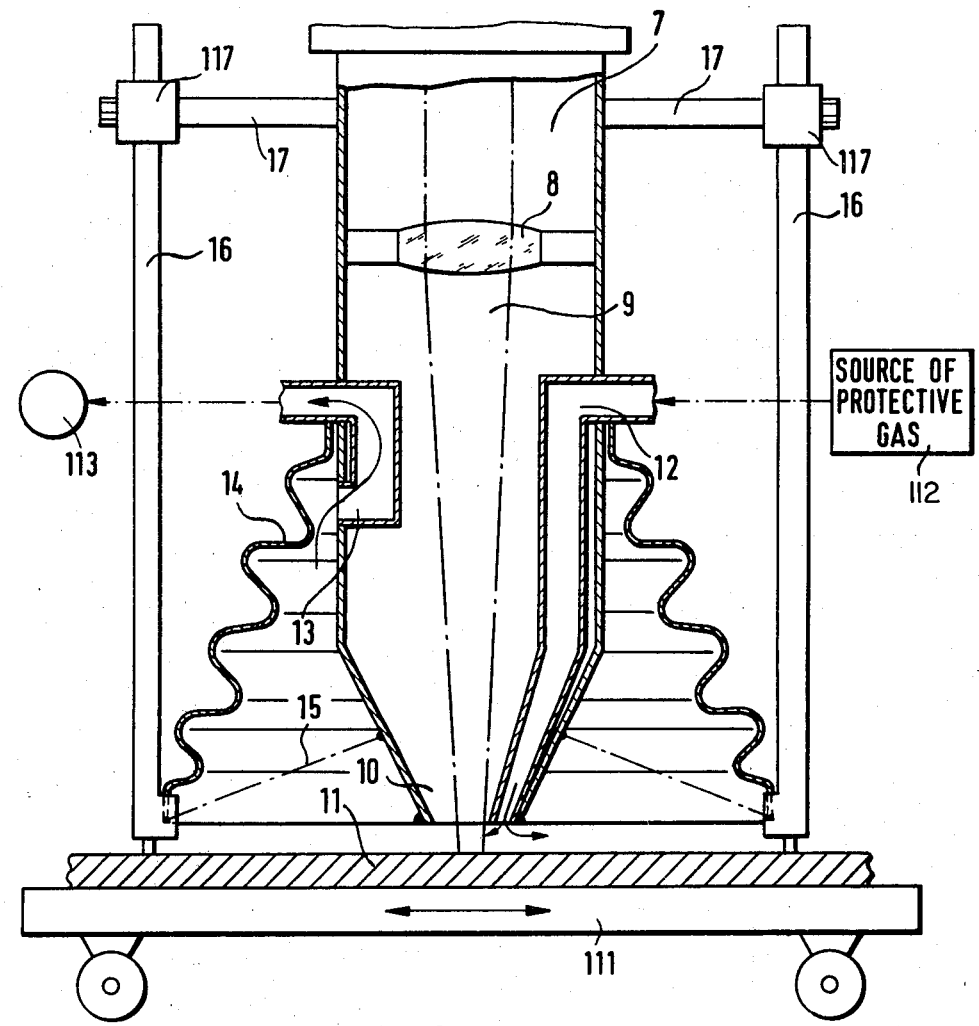
FIG. 2 is a schematic partly sectional view of that portion of the apparatus which focuses the beam upon a metallic object.

FIG. 1 illustrates a portion of an apparatus for the practice of the method which embodies the present invention. More specifically, FIG. 1 shows schematically a gas laser 100 (e.g., a $CO_2$ gas laser) which directs a beam 9 (FIG. 2) into a beam guide including several 90-degree elbows 1 and pipes 4. The elbows 1 contain reflecting mirrors 2 (only one shown). The reference characters 3 denote couplings (e.g., threaded connections) between the pipes 4 and the respective elbows 1. The radiation emitting output of the laser 100 is connected to the inlet 5 of the guide, and the outlet 6 of that portion of the guide which is shown in FIG. 1 is connected with a further portion or mouthpiece 7 (see FIG. 2) of the guide.

The exact details of the means for coupling the outlet 6 to the mouthpiece 7 are not shown in the drawing because they form no part of the present invention. The mouthpiece 7 contains an optical system including a focusing lens 8 for the laser beam 9. The lens 8 is preferably selected in such a way that a focal spot of desired area is located immediately behind the conical radiation emitting or discharging portion 10 of the mouthpiece. The spot is located on the oxidized surface of a metallic object 11 which is to be cleaned by the beam 9. For example, the object 11 may constitute a piece of sheet metal. The means for effecting relative movement between the object 11 and the beam 9 comprises a carriage 11 for the object 11. The means for moving the carriage 111 so that the beam 9 impinges upon successive portions of the upper surface of the object 11 is not shown in the drawing.

The apparatus further comprises a conduit 12 which admits a suitable protective gas from a source 112, and a suction conduit or pipe 13 which serves for evacuation of vapors and is connected with a suction generating device 113 and serves to remove vaporized rust from the region of impingement of the beam 9 upon the object 11. The gas discharging portion of the conduit 12 extends into the interior of the mouthpiece 7, and a portion of the pipe 13 also extends into the interior of the mouthpiece. The radiation emitting or discharging portion 10 of the mouthpiece 7 is surrounded by a bellows or hood 14 which is secured to a frame and is maintained in spread-apart condition by arms 15 which are indicated by phantom lines. It will be noted that the gas discharging portion of the conduit 12 is closely adjacent to the respective region of the inner side of the radiation emitting or discharging portion 10 of the mouthpiece 7. The inlet of the pipe 13 is remote from the surface of the object 11 and is close to the rear (upper) end of the hollow conical bellows 14. The arms 15 are articularly or fixedly connected to the portion 10 of the mouthpiece 7 and to the lower end portions of rod-shaped distancing members 16 which are adjustably secured to holders 17 extending radially of and attached to the mouthpiece behind the end portion 10. The members 16 rest on the object 11. If the bellows 14 is connected directly to the lower end portions of the distancing members 16, the arms 15 can be dispensed with. The reference characters 117 denote adjustable connections between the distancing members 16 and the holders 17. These connections render it possible to place the open lower end of the bellows 14 close to the upper surface of the object 11, i.e., to establish between the bellows and the object a gap of desired width. Moreover, by moving the connections 117 lengthwise of the distancing members 16, an operator can select the distance between the discharge end of the mouthpiece 7 and the surface of the object 11 or another object. Furthermore, the position of the focusing lens 8 relative to the object 11 can be adjusted by moving the connections 117 toward or away from the object.

The conduit 12 and source 112 can be replaced with or used in addition to one or more sources of a substance for surface treatment of freshly cleaned portions of the object 11. Furthermore, the source 12 can be connected with two or more conduits 12 each of which discharges protective gas into the interior of the bellows 14 at a locus close to the spot where the beam 9 is focused upon the object 11. The connections 17 can be said to constitute a means for accurately focusing the beam 9 on the surface to be treated.

EXAMPLES

The oxide-coated surface of a metallic object to be treated was exposed to a beam issuing from a transversely excited atmospheric-pressure $CO_2$ laser with a wavelength of 10.6 μm. The laser was adjusted to furnish impulses of 1 μs duration. Each such impulse included a peak of 0.1 μs and the remainder of the duration of an impulse was taken up by the tail or runoff interval. The output energy of the impulses was in the range of 3 ws and the power of the peak of each impulse was in the range of 30 Mw. The laser beam was focused upon a spot whose area was approximately 8×8 mm. Thus, the maximum output density was in the range of 47 Mw per square centimeter. Under such circumstances, the area of 8×8 mm has been found to be particularly satisfactory. It has been found that output density should not be too high in order to avoid excessive power losses as a result of pronounced ionization of air at higher energy densities. Metallic objects were treated by a laser beam in air, in a protective atmosphere (Argon) and in a forming gas atmosphere (80-90 percent Argon and 10-20 percent hydrogen).

The metallic objects which were treated constituted scrap of the type found in a scrap metal yard. The objects included (a) a smooth steel duct with a square or rectangular cross-sectional outline (the duct was slightly corroded and its walls carried remnants of protective coat): (b) a water pipe made of steel and exhibiting a medium degree of corrosion; (c) a strongly corroded cast steel pipe; and (d) a sheet metal piece which exhibited a reasonably pronounced (medium) degree of corrosion.

The laser beam was capable of completely removing the oxide layer from all of the objects (a) to (d).

The rate of rust removal (namely, the number of impulses needed for complete removal of rust from an area of 1 $cm^2$) was practically independent of the nature of metallic material; it depended primarily on the degree of corrosion of the test object. One to three impulses were needed for removal of rust from slightly corroded surfaces; number of impulses was between two and five for removal of oxide layers from surfaces with a reasonably pronounced oxide layer; and the number of impulses had to be increased to between ten and twenty for removal of rust from strongly corroded metallic surfaces.

Subsequent metallographic examination of the texture of treated metallic objects failed to reveal any undesirable, dangerous and/or damaging changes as a result of exposure to laser beams. The tested metallic objects merely exhibited a slight degree of decarburization immediately below the surface of parent metal. An X-ray examination revealed the presence of FeC compounds; this was in consonance with the aforementioned determination of slight decarburization.

The surfaces of the aforementioned metallic objects exhibited different consistencies. Thus, the surface of the cleaned metallic duct was smooth. The surface of the water pipe (the same as the surface of the piece of sheet steel) was coated with a thin layer of magnetite which adhered, quite strongly, to the surface of the object (the oxide layer was completely removed after three impulses). The magnetite layer could not be removed, even by reducing the area of application of the beam (i.e., by increasing the density of the output). The reduction of the spot was not carried out to the limit, and it is believed that the magnetite layer could be removed by further increasing the output density.

The X-ray diffraction analysis revealed that the magnetite layer contained remnants of FeOOH (rust) and minute traces of a non-stoichiometric FeC compound.

The above discussed results were obtained by treating the objects in the presence of atmospheric air.

The tests were also carried in the presence of the aforediscussed forming gas (80-90 percent Argon and 10-20 percent hydrogen). In the absence of air, and while a jet of such forming gas was directed against the surface to be cleaned, the aforementioned continuous layer of magnetite did not develop at all; instead, the treated surface exhibited discrete islands of magnetite which were readily separable from such surface by a simple brush.

The results of the aforediscussed experiments indicate that, for practical application of the improved method, resort should be had to a laser with an average power output of or in the range of 1200 kw. The pulse energy should be in the range of 3 ws and the pulse frequency in the range of approximately 400 hertz. In the case of a metallic object exhibiting a medium oxide layer, four pulses per square centimeter of the metallic surface were needed to remove the layer. This corresponds to an hourly output of approximately 36 square meters.

The laser is preferably a gas-cooled laser in order to ensure that it can operate at the aforementioned frequency of approximately 400 hertz. This can be achieved by providing a transverse-flow blower at the laser discharge cavity so as to guide the laser gas in a closed path in heat exchanging relationship with an external gas cooler. The dimensions of such laser, including the housing, approximate $120\times60\times80$ cm$^3$. The weight of such apparatus is in the range of (and need not exceed) 250 kg.

It is clear that the apparatus can be furnished with suitable auxiliary equipment to enhance the versatility of the apparatus. For example, the apparatus can be furnished with several beam guides and with specially designed manually operated rust removers. Such apparatus is capable of treating a wide variety of metallic workpieces.

The aforementioned beam guide means may include a fixed steel pipe with a 90-degree deflection of the beam. The object to be treated is moved past the point upon which the laser beam is focused. Alternatively, the laser can be equipped or combined with a mobile beam guide having a series of successive deflecting mirrors or a scanning system with a pivotable mirror for rapid covering of flat surfaces.

The beam focusing means can include a manually operated member with a focusing lens of great focal length or a facetted mirror. Alternatively, one can resort to special systems of mirrors and/or lenses in combination with a laser scanning system. The gases to be used include a laser gas (mixture of $N_2$, $CO_2$ and Helium) and forming gas (mixture of Argon and hydrogen).

Without further analysis, the foregoing will so fully reveal the gist of the present invention that others can, by applying current knowledge, readily adapt it for various applicatons without omitting features that, from the standpoint of prior art, fairly constitute essential characteristics of the generic and specific aspects of our contribution to the art and, therefore, such adaptations should and are intended to be comprehended within the meaning and range or equivalence of the appended claims.

We claim:

1. A method of removing rust from the surface of an object consisting of oxidizable metal, comprising the step of focusing a laser beam upon the rust to heat the rust to evaporation temperature and to thereby effect evaporation of rust from the surface of said object.

2. The method of claim 1, further comprising the step of pulsing the laser beam.

3. The method of claim 2, wherein the duration of each pulse is between 1 and 100 $\mu$s.

4. The method of claim 2, wherein the power output of the laser beam is between 1 and 5 ws per pulse.

5. The method of claim 1, wherein said focusing step includes focusing the laser beam upon a spot of the surface of said object having an area of between 0.3 and 2 cm$^2$.

6. The method of claim 1, further comprising the step of pulsing the laser beam at a frequency of between 1 and 1000 hertz.

7. The method of claim 6, wherein said frequency is between 100 and 500 hertz.

8. The method of claim 1, further comprising the step of establishing a protective atmosphere in the region of impingement of the laser beam upon the surface of said object.

9. The method of claim 8, wherein said atmosphere is a reducing atmosphere.

10. The method of claim 1, further comprising the step of effecting relative movement between the laser beam and said object so that the beam is focused upon successive portions of the surface of said object.

* * * * *